…

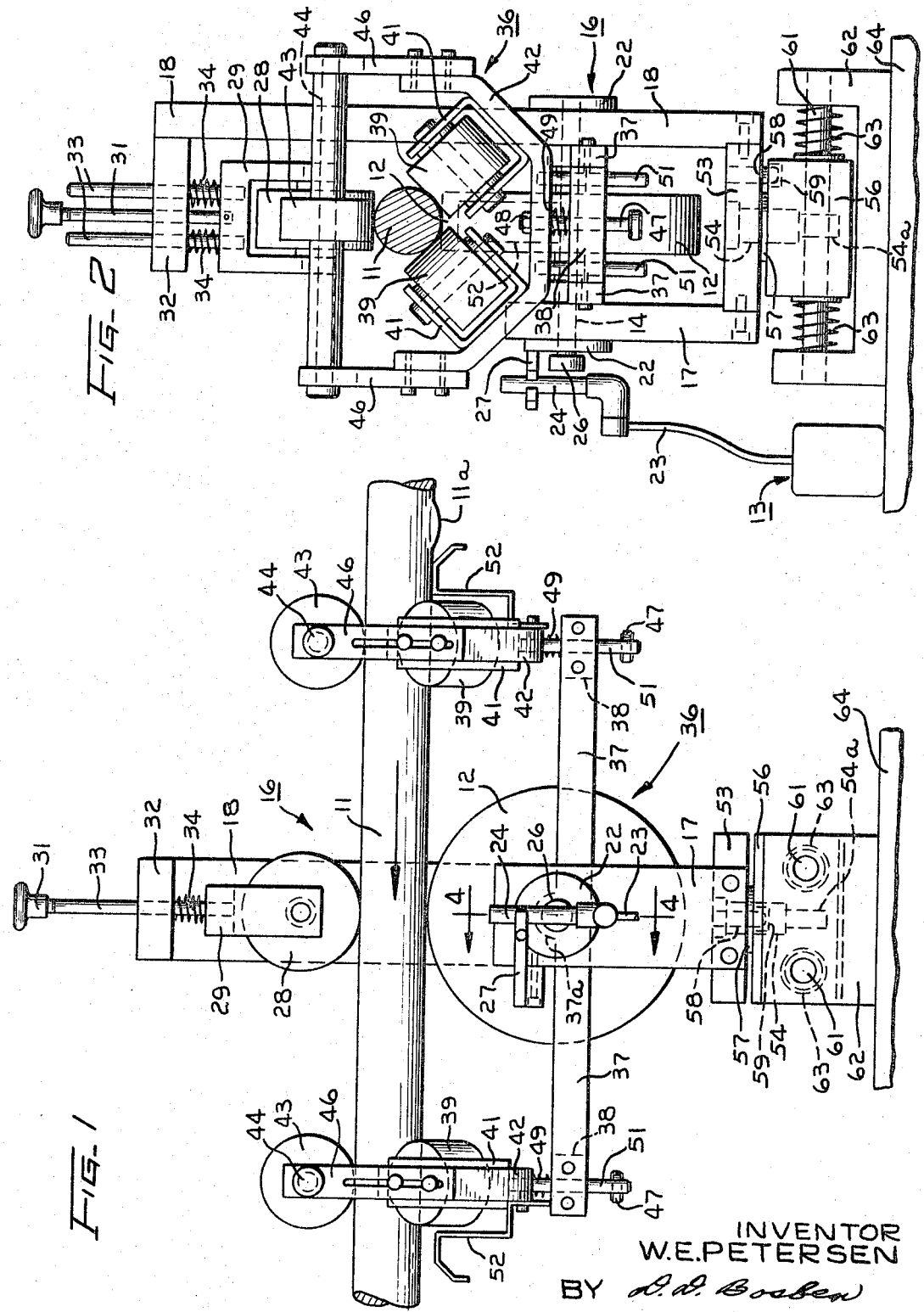

United States Patent Office 3,318,005  
Patented May 9, 1967

3,318,005  
STRAND MEASURING DEVICE  
Warren E. Petersen, Omaha, Nebr., assignor to Western Electric Company, Incorporated, New York, N.Y., a corporation of New York  
Filed June 8, 1964, Ser. No. 373,266  
2 Claims. (Cl. 33—134)

This invention relates to a strand measuring device, and more particularly to a device for measuring the length of a longitudinally moving strand. It is an object of this invention to provide a new and improved device of this character.

In the manufacture of communication cable it is standard practice, as the cable is advanced by a takeup mechanism which winds it upon a reel, to measure the length of the cable by passing it tangentially over a rotatable wheel which operates a counter responsive to the revolutions of the wheel. However, in the past cable length measurements obtained in this manner have been found to be relatively inaccurate. Accordingly, to insure that the required footage of cable was actually wound on each reel it was necessary to utilize a relatively large safety factor and to wind an amount of cable on each reel, as indicated by the counter, in excess of the amount required on the reel.

This procedure is undesirable because in many instances the error actually made by the counting apparatus is less than the maximum expected error by a significant amount, and thus many of the reels have lengths of cable thereon considerably in excess of the amount required. This excess cable, while contributing to production costs, cannot be considered as part of the actual production, thus increasing the cost of manufacture of the cable substantially, particularly where a considerable amount of cable is being manufactured.

Prior known devices for measuring the length of a cable, as above-described, have been inaccurate in that they have no provision for preventing the cable from flexing and presenting a curved concave or convex surface to the counter wheel upon transverse movement of the cable in the plane of rotation of the wheel. Thus, the counter wheel is alternately measuring a convex or concave surface of the cable, instead of a straight line surface tangent to the wheel and corresponding to the centerline length of the cable. Further, these prior known devices do not provide for preventing the cable from travelling in a plane extending obliquely to the plane of rotation of the wheel, instead of in the plane of rotation thereof, and thus the cable tends to rotate the wheel a lesser amount than that corresponding to the actual centerline length of the cable.

Accordingly, another object of this invention is to provide a new and improved device for accurately measuring the length of communication cable being wound on a reel.

A further object of this invention is to provide a new and improved device for measuring the length of a longitudinally moving strand which is more accurate than prior known devices.

A still further object of this invention is to provide a new and improved device which includes a counter wheel for measuring the length of a longitudinally moving strand, in which the strand always extends tangent to the counter wheel despite transverse movement of the strand.

Another object of this invention is to provide a new and improved device including a counter wheel which is tangentially engageable by a longitudinally moving strand for measuring the length of the strand, in which a portion of the strand on opposite sides of its point of engagement with the wheel always travels in the plane of rotation of the wheel.

In accordance with the invention, a rotatable counter wheel is tangentially engageable by a longitudinally advancing strand such that the strand rotates the wheel, and the strand is supported on opposite sides of its point of engagement with the wheel such that a portion of the strand between the support points always extends in the plane of rotation of the wheel tangent to the wheel despite transverse movement of the strand.

In a preferred embodiment of the invention, a device for measuring the length of a longitudinally advancing strand includes a support member movable between limits in opposite directions transversely with respect to the direction of travel of the strand, and biased toward a position intermediate the limits of its movement. A turret is mounted on the support member for rotation about an axis perpendicular to the direction of travel of the strand and the path of movement of the support member, and a counter wheel is mounted on the turret for rotation about an axis perpendicular to the axis of rotation of the turret. As the strand advances, it is urged into firm engagement with the counter wheel such that it rotates the counter wheel, and is supported by roller assemblies at points on opposite sides of its point of engagement with the wheel such that a portion of the strand between the roller assemblies always extends in the plane of rotation of the counter wheel tangent thereto despite transverse movement of the strand. For this purpose, the roller assemblies are supported adjacent the opposite ends of a rocker frame centrally mounted for rotation about the axis of rotation of the counter wheel.

This invention, together with further objects and advantages thereof, will best be understood by reference to the following detailed description taken in connection with the accompanying drawings, in which FIG. 1 is a side elevational view of the device in one possible operating position;

FIG. 2 is an end elevational view of the device shown in FIG. 1 with a part omitted;

Figure 3:
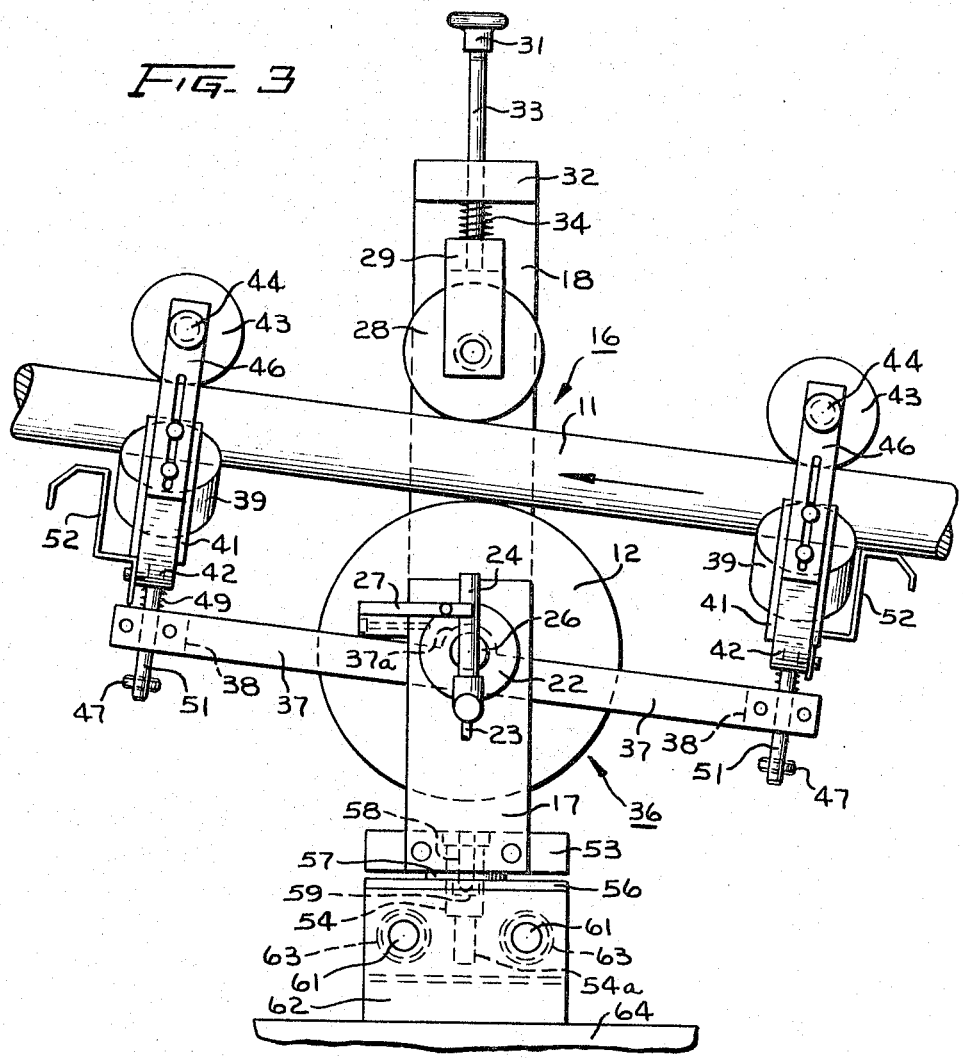
FIG. 3 is a side elevational view similar to FIG. 1 and illustrating a second possible operating position of the device.

Referring to FIGS. 1–3 of the drawings, it is seen that the illustrated embodiment of the invention is designed to measure the length of a longitudinally moving strand 11, such as a relatively rigid cable being advanced to the left, as viewed in FIGS. 1 and 3, by takeup apparatus (not shown) which winds the cable upon a reel. For this purpose, as the strand 11 is advanced, a portion thereof is continuously maintained in tangent relationship with respect to a rotatable counter wheel 12 and in the plane of rotation of the counter wheel, such that the counter wheel is rotated by the strand to operate a counter 13 (FIG. 2).

Figure 4:
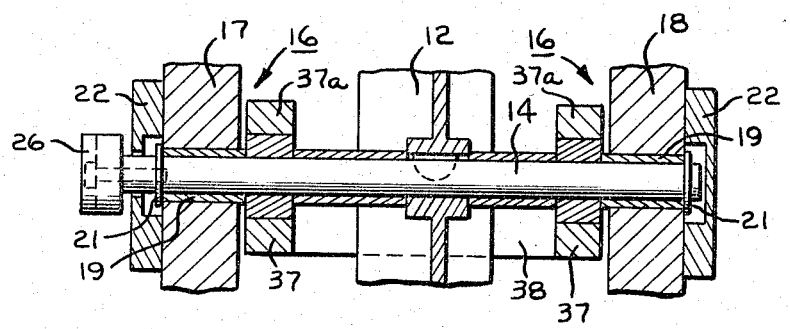
FIG. 4 is a partial cross-sectional view taken substantially along the line 4—4 of FIG. 1.

As is best shown in FIG. 4, the counter wheel 12 is keyed to a shaft 14 which is journalled adjacent its ends for rotation on a turret 16 in vertical side members 17 and 18 of the turret by suitable low friction bearings 19. The shaft 14 is held against any substantial longitudinal movement by removable retaining rings 21 disposed in circumferentially extending grooves adjacent the ends of the shaft. Cover members 22 for the end portions of the shaft 14 are secured to the vertical side members 17 and 18 of the turret by suitable screws.

The counter 13 may be of any suitable type, as for example the electronic model SD–IT manufactured by Post Electronics of Beverley, Massachusetts. This counter 13 includes a lead 23 having one end connected to circuitry of the counter and having a magnetic switch 24 attached to its other end. The counter 13 also includes a magnet 26, which in the illustrated embodiment of the invention is secured by a screw to the left-hand end (FIGS. 2 and 4) of the counter wheel shaft 14, the shaft projecting through the adjacent cover member 22 for this purpose. The magnetic switch 24 is supported opposite the magnet 26 by a suitable bracket 27 mounted on the vertical side member 17 of the turret 16. As the counter wheel 12 and the shaft 14 are rotated by the advancing strand 11 the rotating magnet 26 alternately opens and closes the magnetic switch 24 to energize the counter 13 in a well known manner.

As is shown in FIGS. 1, 2 and 3, the advancing strand 11 is held in firm engagement with the counter wheel 12 by a keeper roller 28 suitably mounted for rotation between the legs of an inverted U-shaped support member 29. The support member 29 is secured to the lower end of a vertical lift rod 31 mounted for vertical sliding movement in a horizontally extending, cantilevered arm 32 of the turret 16, the arm being secured at its right-hand end (FIG. 2) to the top of the vertical side member 18 of the turret. The keeper roller 28, its support member 29 and the lift rod 31 are retained against twisting movement about a vertical axis by spaced vertical rods 33, which have their lower ends suitably secured to the support member 29 and upper portions thereof slidably mounted in the cantilevered arm 32, and are biased downward toward the counter wheel 12 by coil springs 34 encircling the rods between the arm and the top of the support member. By pulling upward on the lift rod 31, the keeper roller 28 can be moved away from the counter wheel 12 for the threading of the strand 11 between the roller and the counter wheel at the beginning of a counting operation, after which the coil springs 34 will urge the roller downward to hold the strand in firm engagement with the counter wheel whereby the wheel is rotated by advancement of the strand as noted hereinabove.

As the strand 11 is advanced the portion thereof on opposite sides of its point of engagement with the counter wheel 12 is maintained in tangent relationship with respect to the counter wheel (FIGS. 1 and 3) and in the plane of rotation of the counter wheel as noted hereinabove, by a rocker assembly 36, thereby preventing inaccuracy in the measurement of the length of the strand beacuse of the strand moving vertically upward or downward, or because of the strand assuming a path of travel in a plane extending obliquely to the plane of rotation of the counter wheel. In this regard, movement of the strand 11 vertically upward would cause it to present a downwardly convex surface to the counter wheel 12, while movement of the strand vertically downward would cause it to present a downwardly concave surface to the counter wheel, the first condition causing rotation of the counter wheel an amount in excess of the actual centerline length of the strand, and the latter condition causing rotation of the counter wheel an amount less than the actual centerline length of the strand. Similarly, travel of the strand 11 obliquely with respect to the plane of rotation of the counter wheel 12 would cause the counter wheel to be rotated a lesser amount than the strand's actual length.

The rocker assembly 36 includes an elongated, rectangular frame formed by a pair of longitudinally extending side frame member 37 and a pair of end frame members 38, the members being secured together by suitable screws. The side frame members 37 include enlarged semi-circular portions 37a (FIGS. 1 and 4) centrally thereof, by which the frame 37, 38 is journalled for rotation on the counter wheel shaft 14 by suitable low friction bearings (FIG. 4).

The strand 11 is supported by the rocker assembly 36 adjacent each end of the rocker assembly frame 37, 38 on a pair of rollers 39 arranged to define a substantially V-shaped nest in which the strand is received. As is best shown in FIG. 2, each of the rollers 39 is suitably supported for rotation between the legs of a U-shaped bracket 41 secured to an associated leg of an upstanding yoke member 42. A keeper roller 43 is supported for rotation above the pair of rollers 39 in a suitable manner, as for example, on a shaft 44 extending between and mounted on the upper ends of a pair of vertical bar members 46. The lower ends of the bar members 46 are adjustably secured to the legs of the yoke member 42, as for example by screw and slot connections as shown in FIGS. 1 and 2, so that the keeper roller 43 can be moved upward for threading of the strand 11 between the roller and the pair of rollers 39, and subsequently can be moved downward and clamped in a position in which it holds the strand in firm engagement with the pair of rollers and against transverse movement relative thereto. A suitable retractable stop (not shown) may be provided on the turret 16 for preventing rotation of the rocker assembly 36 during the threading operation, to facilitate the threading of the strand 11 through the device, if so desired.

As is best shown in FIG. 2, each of the yoke members 42 is supported for vertical movement on the upper portion of a mounting post 47 which extends vertically through an associated one of the end members 38 of the rocker frame 37, 38, and which is screw threadably mounted in the end member. Adjacent the upper end of the mounting post 47 a nut member 48 is screw threaded thereon, and the yoke member is normally maintained in engagement with the nut member by a relatively strong coil spring 49 encircling the mounting post between the yoke member 42 and the rocker frame end member 38. The yoke member 42 is guided in its vertical movement by spaced vertical rods 51 secured at their upper ends to the yoke member and slidably extending downward through apertures in the rocker frame end member 38. By turning the screw threaded mounting posts 47 in the rocker frame end members 38 and/or properly positioning the nut members 48 on the posts, the yoke members 42 can be located so that the portion of the strand 11 between the sets of rollers 39, 43 is supported thereby in tangent relationship with respect to the counter wheel 12 as shown in FIGS. 1 and 3 and described hereinabove, so as to accommodate different sizes of the strand.

At the right-hand side of the device, as viewed in FIG. 1, a bracket 52 (omitted from the end elevational view of FIG. 2) for guiding the underside of the strand 11 into the pair of rollers 39 at that side of the device, and for flattening and compressing any protrusions or undulations 11a on the underside of the strand, is adjustably mounted for vertical movement on the adjacent yoke member 42, as for example by laterally spaced screws extending through vertical slots in the bracket and screw threaded into the yoke member. This flattening of the protrusions 11a on the strand 11 reduces the danger of a protrusion becoming engaged between the adjacent peripheral edges of the pair of rollers 39 so as to cause damage to the strand or the device. An identical guide and protrusion flattening bracket 52 is provided at the other side of the device for use when the strand 11 is advanced through the device in the reverse direction.

In the illustrated embodiment of the invention, the efficiency of the rocker assembly 36 in maintaining the strand 11 tangent to the counter wheel 12 and in the plane of rotation thereof, as above-described, is improved by the counter wheel and rocker assembly being arranged so that they can adjust to any tendency for the strand to move transversely in a horizontal plane. In this regard, referring to FIGS. 1 and 2, it is seen that the turret 16 includes a lower horizontal plate member 53 which is secured by screws between the lower ends of the turret side members 17 and 18, and which receives an upper head portion of a pin member 54 therethrough for mounting the turret, and thus the counter wheel 12 and the rocker assembly 36, for rotation about a vertical axis extending perpendicular to the path of movement of the strand 11. A lower end portion 54a of the pin member 54 is screw threaded into a slide member 56 mounted for horizontal movement transversely with respect to the path of movement of the strand 11, as viewed in FIG. 2. The underside of the plate member 53 is supported by a suitable thrust bearing assembly 57 mounted in a recess in the slide member 56. The extent of rotation of the turret 16, the counter wheel 12 and the rocker assembly 36 relative to the slide member 56 is limited by a vertical pin 58 carried by the plate member 53 and projecting downward from the plate member into a recess 59 in the top of the slide member for limited movement in the recess.

The slide member 56 is slidably supported on a pair of horizontal parallel shafts 61 having their opposite ends mounted in upstanding legs of a U-shaped base member 62. The slide member 56 is urged toward a position centrally between the upstanding legs of the base member 62 by coil springs 63 disposed about the shafts 61 between the legs and the slide member. The base member 62 is secured to a suitable support 64, which may be of a portable type mounted on wheels to provide flexibility in the use of the measuring device.

In operation, the strand 11 is positioned in the device as shown in FIGS. 1 and 2, with the portion of the strand between the sets of rollers 39, 43 at the opposite ends of the rocker frame 37, 38 extending tangentially relative to the counter wheel 12. Then, as the strand 11 is advanced it is maintained in firm engagement with the counter wheel 12 by the spring-biased keeper roller 28 such that the counter wheel is rotated by the strand to cause rotation of the support shaft 14, whereby the magnet 26 on the left-hand end (FIGS. 2 and 4) of the shaft rotates to cause alternate opening and closing of the magnetic switch 24 to energize the counter 13.

As the strand 11 is advanced, the sets of rollers 39, 43 at the opposite ends of the rocker frame 37, 38 prevent movement of the strand transversely with respect to the frame and the rollers, to maintain the portion of the strand between the rollers in its tangent relationship with respect to the counter wheel 12 and in the plane of rotation thereof. For example, in the event that the strand 11 moves transversely in the plane of rotation of the counter wheel 12, such that one side of the rocker assembly 36 is moved upward, as shown in FIG. 3, the rotation of the rocker frame 37, 38 about the support shaft 14 causes the other end of the rocker assembly to move downward a corresponding amount. Thus, flexing of the portion of the strand 11 between the sets of rollers 39, 43 is prevented and the strand always travels tangent to the counter wheel and in the plane of rotation of the counter wheel in the measuring area, whereby the counter wheel is always measuring the length of the strand along its centerline. In this connection, during movement of the strand 11 and the rocker assembly 36 as shown in FIG. 3, the relatively strong coil springs 49 maintain the yoke members 42 constantly engaged against the nut members 48 unless the force exerted on the yoke members by the strand becomes excessive.

If the advancing strand 11 tends to move transversely in a horizontal plane, or to assume a path of travel oblique to the plane of rotation of the counter wheel 12, the counter wheel and the rocker assembly 36, as a result of the turret 16 being mounted for movement about a vertical axis on the horizontally movable slide member 56, adjusts to the new path of movement of the strand. Accordingly, stress upon the device as a result of the strand 11 tending to move in this manner is substantially reduced and the efficency of the rocker assembly 36 is substantially increased.

While one embodiment of the invention has been disclosed, many modifications will be apparent and it is intended that the invention be interpreted as including all modifications which fall within the true spirit and scope of the invention.

What is claimed is:
1. A device for measiuring the length of a longitudinally advancing strand, which comprises:
a support member mounted for movement between limits in opposite directions transversely with respect to the direction of travel of the strand;
resilient means biasing said support member toward a position intermediate the limits of movement of said support member;
a turret mounted on said support member for rotation about an axis extending substantially perpendicular to the direction of travel of the strand and to the path of movement of said support member;
a counter wheel mounted on said turret for rotation about an axis perpendicular to the axis of rotation of said turret;
means urging the advancing strand into firm engagement with said counter wheel such that the strand rotates said counter wheel;
elongated rocker frame means mounted at its longitudinal midpoint for rotation about the axis of rotation of said counter wheel; and
first and second roller means mounted on said rocker frame means adjacent the opposite ends thereof and movable therewith about the axis of rotation of said counter wheel in the plane of rotation of said wheel, for supporting the advancing strand at points on opposite sides of the point of engagement of the strand with said counter wheel so as to prevent any substantial transverse movement of the strand relative to said roller means and such that a portion of the strand between said roller means always extends in the plane of rotation of said counter wheel tangent to said wheel despite transverse movement of the strand.

2. A device for measuring the length of a longitudinally advancing strand, which comprises:
a support member mounted for movement between limits in opposite directions from a normal intermediate position and transversely with respect to the direction of travel of the strand;
a turret mounted on said support member for rotation about an axis extending substantially perpendicular to the direction of travel of the strand and to the path of movement of said support member;
a counter wheel mounted on said turret for rotation about an axis perpendicular to the axis of rotation of said turret;
means urging the advancing strand into firm engagement with said counter wheel such that the strand rotates said counter wheel;
rocker frame means having a longitudinal dimension and mounted at a point intermediate said longitudinal dimension for rotation about the axis of rotation of said counter wheel; and
first and second support means mounted on said rocker frame means and movable threwith about the axis of rotation of said counter wheel in the plane of rotation of said wheel, for supporting the advancing strand at points on opposite sides of the point of engagement of the strand with said counter wheel so as to prevent any substantial transverse movement of the strand relative to said support means and such that a portion of the strand between said support means always extends in the plane of rotation of said counter wheel tangent to said wheel despite transverse movement of the strand.

References Cited by the Examiner

UNITED STATES PATENTS

| | | | |
|---|---|---|---|
| 2,087,335 | 7/1937 | Seely | 33—134 |
| 2,121,870 | 6/1938 | Greene | 33—134 X |
| 2,921,282 | 1/1960 | Krouse et al. | |
| 3,068,579 | 12/1962 | Newman | 33—134 |

FOREIGN PATENTS 636,822   5/1950   Great Britain.

LEONARD FORMAN, Primary Examiner.

W. K. QUARLES, J. M. FREED, Assistant Examiners.